B. R. JOLLY.
INSECT CATCHER.
APPLICATION FILED JULY 6, 1918.
1,308,497.
Patented July 1, 1919.
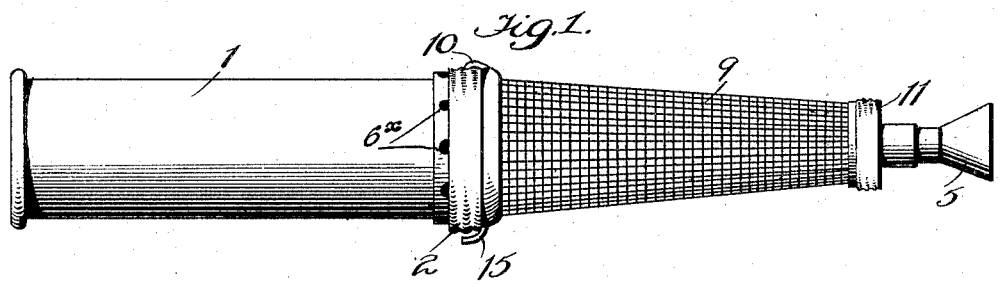
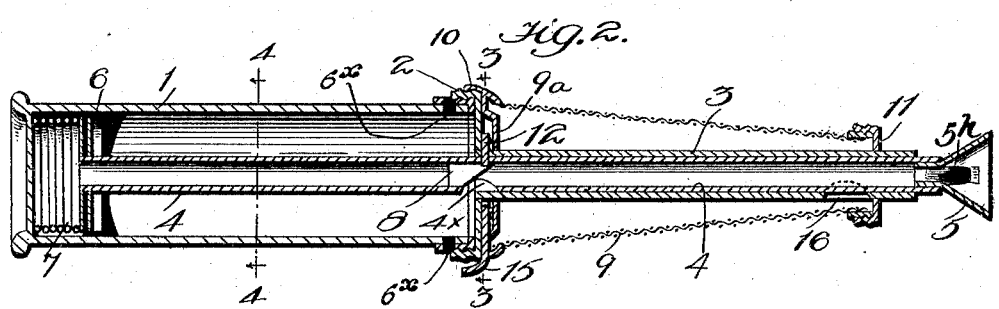
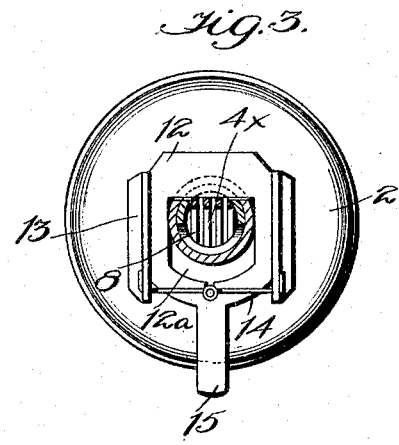
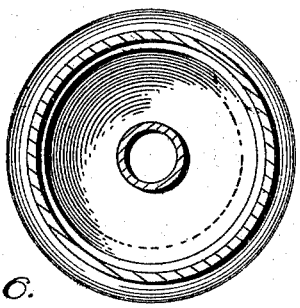
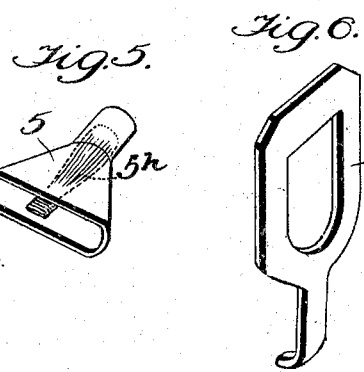
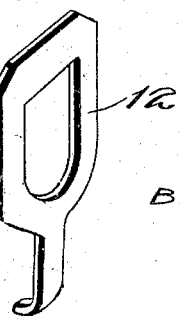
WITNESSES
George C. Myers.
INVENTOR
BENJAMIN R. JOLLY,
BY
ATTORNEYS

UNITED STATES PATENT OFFICE.

BENJAMIN R. JOLLY, OF RALEIGH, NORTH CAROLINA.

INSECT-CATCHER.

1,308,497.  Specification of Letters Patent.  Patented July 1, 1919.

Application filed July 6, 1918. Serial No. 243,635.

*To all whom it may concern:*

Be it known that I, BENJAMIN R. JOLLY, a citizen of the United States, and a resident of Raleigh, in the county of Wake and State of North Carolina, have invented certain new and useful Improvements in Insect-Catchers, of which the following is a specification.

My invention relates to improvements in insect catchers, and it consists in the combinations, constructions, and arrangements herein described and claimed.

An object of my invention is to provide a device by means of which flies, mosquitoes, or other insects may be easily caught and trapped.

A further object of my invention is to provide a spring operated suction device by means of which a fly or other insect may be drawn forcibly into a receiver or cage.

A further object of my invention is to provide a device of the character described having a tube which may be suddenly projected forwardly so as to scoop up the insect while at the same time, a current of air sweeps the insect into the receiver or cage.

Other objects and advantages will appear in the following specification and the novel features of the invention will be particularly pointed out in the appended claims.

My invention is illustrated in the accompanying drawings forming part of this application in which:

Figure 1 is a side view of the device,

Fig. 2 is a section taken longitudinally through the device,

Fig. 3 is an enlarged section on the line 3—3 of Fig. 2,

Fig. 4 is an enlarged section along the line 4—4 of Fig. 2,

Figs. 5 and 6 are perspective views of parts of the device.

Referring particularly to Figs. 1 and 2 I have shown therein a tube 1 which is preferably made of paper and which is closed at one end. This tube is provided with a screw cap 2 to which a sleeve or hollow rod 3 is secured. Arranged to extend through the rod 3 is a hollow tube or pipe 4 the outer end of which is provided with a removable flared end member 5 and the inner end passes through a piston 6 disposed on the interior of the tube 1. A spring 7 is disposed between the piston 6 and the end of the tube 1.

It will be observed that there is an opening $4^x$ in the tube 4 and that immediately adjacent thereto is a series of inclined grids 8 which are firmly secured in position within the tube as shown in Figs. 2 and 3. The purpose of these grids will be explained later.

At the forward part of the device is a cage or receptacle made preferably of wire netting 9. One end of this cage has a base portion $9^a$ which is provided with a spring catch 10 arranged to engage the cap 2 so as to hold the cage in position. The opposite end has a threaded cap 11 which may be removed. The base $9^a$ and the cap 11 are provided with openings so as to permit the cage to be placed over the sleeve 3 and locked in position by means of the catch 10.

Referring to Fig. 3 it will be seen that the cap 2 bears a trigger 12 which consists of a plate having an opening $12^a$ therein and slidable underneath guides 13. The plate is normally held by a spring 14 in a slot in the tube 4 but it may be forced out of the slot by pressing on the thumb piece 15 which extends outwardly as shown in the drawing. The tube 3 is of course slotted to permit the engaging portion of the trigger to enter the slot in the tube 4 as shown in Fig. 2.

From the foregoing description of the various parts of the device, the operation thereof may be readily understood. The device is "set" by pushing inwardly on the outer end of the tube 4. This compresses the spring 7 and brings the slot in the tube 4 into registration with the trigger 12 which thereupon holds the tube 4 in the position shown in Fig. 2 against the tension of the spring 7. A fly is located and the mouth of the tube 4 *i. e.*, the member 5, is placed a short distance from the fly. The trigger 15 is now pressed, which frees the tube 4 and the latter is suddenly forced forwardly by the spring 7; the forward movement of the piston 6 causes the air in front of the piston to be expelled from the cylinder through the openings $6^x$. The member 5 scoops up the fly and the rearward current of air which rushes in to fill the vacuum within the cylinder 1 carries the fly through the tube 4 until he strikes the grid 8. At this time, however, the grid 8 is in registration with the opening 16 at the forward end of the tube 3 so that the fly is ejected into the cage 9. To reset the device it is only necessary to push to tube 4 inwardly again.

In order to remove the flies that are caught in the cage 9, the cap 11 may be unscrewed and the cage may be emptied.

In order to prevent the insect which has been drawn into the tube, but not into the receiver, from escaping through the end of the device, I provide in the mouthpiece 5 a barrier which consists preferably of hairs arranged to move aside when the insect is drawn into the tube but which will prevent his escape. These hairs are such as may be obtained from rabbit's fur, or the like, a small portion of the skin being cemented or otherwise secured on the interior of the mouthpiece with the hairs pointing inwardly as clearly shown at $5^h$ in the drawings.

I claim:—

1. An insect catcher comprising a tube, a piston within the tube, a spring for operating the piston, a catch for holding the spring in compressed condition, a trigger for releasing the catch, a removable receptacle secured to one end of said tube and a forwardly projecting intake tube having communication with the interior of said receptacle.

2. An insect catcher comprising a cylinder, a piston disposed therein, a tube having one end extending through said piston, the opposite end extending outside of the cylinder, a sleeve surrounding said tube and secured to one end of said cylinder, a removable receptacle secured to the cylinder and surrounding the sleeve and having communication with the interior of said tube when the latter is in its extended position.

3. An insect catcher comprising a cylinder, a piston disposed therein, a tube having one end extending through said piston, the opposite end extending outside of the cylinder, a sleeve surrounding said tube and secured to one end of said cylinder, a catch for holding the spring compressed and for releasing it at will, said tube having an opening therein and a receptacle surrounding said tube and communicating with the opening.

4. An insect catcher comprising a cylinder, a piston disposed therein, a tube having one end extending through said piston, the opposite end extending outside of the cylinder, a sleeve surrounding said tube and secured to one end of said cylinder, a catch for holding the spring compressed and for releasing it at will, said tube having an opening therein, a receptacle surrounding said tube and communicating with the opening, and means inside of said tube for deflecting a body drawn through said tube, into said receptacle.

5. An insect catcher comprising a cylinder, a piston disposed therein, a tube having one end extending through said piston, the opposite end extending outside of the cylinder, a sleeve surrounding said tube and secured to one end of said cylinder, a catch for holding the spring compressed and for releasing it at will, said tube having an opening therein, a receptacle surrounding said tube and communicating with the opening, means inside of said tube for deflecting a body drawn through said tube, into said receptacle, and a removable flared end piece for said tube.

6. An insect catcher comprising a cylinder closed at one end and having a screw cap at the other, a sleeve secured to said screw cap, a slidable tube disposed within the sleeve and arranged to extend within the cylinder, a piston secured to said slidable tube, a spring disposed between the piston and one end of said cylinder, said slidable tube having an opening, a grid adjacent to said opening and a trigger for holding said spring compressed and for releasing it at will.

7. An insect catcher comprising a cylinder closed at one end and having a screw cap at the other, a sleeve secured to said screw cap, a slidable tube disposed within the sleeve and arranged to extend within the cylinder, a piston secured to said slidable tube, a spring disposed between the piston and one end of said cylinder, said slidable tube having an opening, a grid adjacent to said opening, said sleeve having an opening adapted to register with the opening in said tube in the extended position of the latter, a trigger for holding said spring compressed and for releasing it at will, and a conical-shaped receptacle arranged to fit over the sleeve, said receptacle having communication with said slidable tube through said opening in the extended position of the tube, and means for securing said receptacle to said cylinder.

8. An insect catcher comprising a tube, a piston within the tube, a spring for operating the piston, a catch for holding the spring in compressed position, a trigger for releasing the catch, a removable receptacle secured to one end of said cylinder, a forwardly projecting intake tube having communication with the interior of said receptacle, a mouthpiece at the end of said intake tube, and means consisting of a series of hairs secured within the mouthpiece and arranged to be moved aside during the inward movement of the insect and to spring into position to prevent the escape of the insect.

9. An insect catcher comprising a cylinder, a piston disposed therein, a tube having one end extending through said piston, the opposite end extending outside of the cylinder, a sleeve surrounding said tube and secured to one end of said cylinder, and being provided with an opening arranged to register with a similar opening in the tube when the latter is in its forward position, and a detachable receptacle of wire mesh surrounding said sleeve, said receptacle having communication with said tube in the extended position of the latter.

BENJAMIN R. JOLLY.

Copies of this patent may be obtained for five cents each, by addressing the "Commissioner of Patents, Washington, D. C."